United States Patent Office 3,536,777
Patented Oct. 27, 1970

3,536,777
OLEFIN DISPROPORTIONATION
Henk J. Alkema and Robert van Helden, Amsterdam, Netherlands, assignors to Shell Oil Company, New York, N.Y., a corporation of Delaware
No Drawing. Filed July 13, 1967, Ser. No. 653,036
Claims priority, application Great Britain, Apr. 5, 1967, 15,547/67
Int. Cl. C07c 3/62
U.S. Cl. 260—683                        7 Claims

ABSTRACT OF THE DISCLOSURE

The disproportionation of acyclic olefins in the presence of molybdenum, tungsten or rhenium-containing disproportionation catalysts, and especially those containing certain transition metals, e.g. cobalt, and certain alkali metals, is improved by conducting the process in the presence of added molecular hydrogen.

BACKGROUND OF THE INVENTION

The term "disproportionation" as applied herein is applicable to processes of converting an acyclic olefin into principally olefinic products of higher and of lower numbers of carbon atoms per molecule than the olefinic reactant. As an example, propylene is converted in a disproportionation process to ethylene and butylene. This type of conversion has been examined in the presence of a number of transition metal catalyst compositions, e.g., the supported molybdenum oxide and tungsten oxide catalysts disclosed as useful in the disproportionation of olefins by Banks, U.S. 3,261,879, issued July 19, 1966.

The available disproportionation processes, however, are characterized by a limited catalyst life, particularly when the olefin feed contains a substantial proportion of conjugated dienes as an impurity.

SUMMARY OF THE INVENTION

It has now been found that when the olefin disproportionation process is conducted in the presence of molecular hydrogen, the deterioration of catalyst activity typically observed during disproportionation processes is markedly retarded and the absolute disproportionation activity of the catalyst is increased. Moreover, the catalyst toleration for conjugated diene contaminant in the olefin feed is increased so that the necessity for substantially complete removal of conjugated diene impurities from the olefin feed is obviated when molecular hydrogen is present in the reaction mixture.

DESCRIPTION OF PREFERRED EMBODIMENTS

The catalyst

The olefin disproportionation catalyst compositions comprise more or less conventional supported olefin disproportionation catalysts preferably modified by the inclusion therein of a compound of an alkali metal having an atomic number of at least 19. Such modified catalysts are described in copending U.S. application Ser. No. 605,209 filed Dec. 12, 1966, and now abandoned by Van Helden et al. The active catalyst composition component comprises a compound of molybdenum, tungsten or rhenium, which compound is preferably the metal oxide or a compound which is readily convertible to the corresponding oxide, e.g., a sulfide, a π-alkenyl derivative or a carbonyl derivative. Best results are obtained when the active catalyst component is present as the oxide and when the catalyst is provided in some other form, pretreatment is customarily employed to convert the catalyst compound as provided to the corresponding oxide. The proportion of molybdenum, tungsten or rhenium to be employed in the supported catalyst composition is variable but amounts from about 0.5% by weight to about 30% by weight, calculated as the metal on the catalyst support, are satisfactory with proportions of from about 5% by weight to about 20% by weight, calculated on the same basis, being preferred.

In certain modifications of the process, it has been found desirable to include within the supported catalyst composition lesser amounts of a catalyst promoter in addition to the active catalyst materials as described above. Suitable catalyst promoters are transition metals, particularly transition metals of the fourth and fifth periods of the Periodic Table, e.g., cobalt, nickel, manganese, iron, chromium, vanadium, titanium, rhodium, palladium, and the like. The form in which the catalyst promoters are employed is preferably the oxide, although compounds which are readily converted to the oxide are also suitably employed as these are typically converted to the oxide as during pretreatment subsequent to the formation of the initially prepared catalyst composition but prior to use in the disproportionation process. The amount of catalyst promoter is not critical, and as previously stated no catalyst promoter is required. When present, amounts of catalyst promoter up to about 15% by weight, calculated as the metal on the catalyst support, are satisfactory. The use of cobalt as a catalyst promoter is preferred, particularly in combination with a molybdenum catalyst, and especially satisfactory results are obtained by employing such a combination wherein the amount of cobalt present is from about 0.5% by weight to about 5% by weight, also calculated as the metal on the catalyst support.

A feature of the preferred catalyst compositions is the presence therein of a minor proportion of a compound of certain alkali metals as a catalyst modifier. Although the precise role of the alkali metal compound is not known with certainty, it is evident that the alkali metal, when present, plays a substantial role in determining the selectivity of the disproportionation process to olefins of no more than 2n–2 carbon atoms when the olefin reactant has n carbon atoms. The preferred alkali metal compound to be employed is the oxide, although the alkali metal is suitably, and in fact is customarily, provided in some other form of chemical combination, e.g., the hydroxide, nitrate or the like which is readily converted to the oxide. The choice of the metal of the alkali metal compound is of importance as compounds of all alkali metals are not effective in modifying the activity of the disproportionation catalysts. Suitable alkali metals are alkali metals of an atomic number from 19 to 55 inclusive, i.e., potassium, rubidium or cesium, whereas the lighter alkali metals, sodium and lithium, are not effective. Largely for reasons of economics, the use of compounds of potassium as the catalyst modifier is preferred. Typical effective proportions of the alkali metal compound, calculated as alkali metal on the catalyst support, are from about 0.05% by weight to about 5% by weight, with amounts from about 0.3% by weight to about 2.5% by weight, calculated on the same basis, being preferred.

The composition of the catalyst support employed in the supported catalyst compositions is also of importance in obtaining suitable reaction selectivities. Broadly, suitable catalyst supports comprise at least a major proportion of alumina with no more than minor quantities of other components. The catalyst support suitably contains up to 25% by weight based on total support of components such as silica or magnesia which are essentially inert and which do not substantially promote undesirable side reactions. The support therefore comprises at least 75% by weight of alumina and preferably at least 95% by weight of alumina with any remainder being essentially inert support material.

The preparation of the supported catalyst compositions is effected by conventional techniques of dry-mixing, coprecipitation, impregnation and the like, and the catalyst composition components are introduced in one operation or are added separately in stages. In the latter modification, the order in which the various components are added to the support is not critical, although it is generally preferred to add the alkali metal compound subsequent to the other catalyst components.

In practice, the catalyst composition is subjected to a pretreatment or activation prior to utilization in the disproportionation process. The precise method of pretreatment will depend in part upon the form of chemical combination in which the components are provided, but in general the pretreatment comprises heating an initially prepared supported catalyst in an atmosphere of a nonreducing gas such as nitrogen, argon, carbon monoxide or oxygen-containing gas, e.g., air. One function served by the pretreatmet operation is to convert the catalyst, catalyts promoter and catalyst modifier compounds into the form of oxides if these components were not initially provided as the oxide. For example, initial catalyst composition components such as ammonium molybdate, ammonium perrhenate, cobalt nitrate, potassium hydroxide and the like are converted to corresponding oxides by heating in a nonreducing atmosphere. It is desirable that at least a major proportion of the catalyst components be present in the highest possible positive oxidation state and if such is not already the case, the desired elevation of positive oxidation state is effected by pretreatment in the presence of oxygen, either alone or in mixture with other gases. For example, molybdenum or tungsten carbonyls, initially zero-valent, are converted at least in part to the corresponding hexavalent oxides by heating in the presence of air. Regardless of the form in which the catalyst components are provided, the formed catalyst should be maintained for a time at an elevated temperature. The pretreatment temperature is not critical and temperatures from about 350° C. to about 750° C. are satisfactory. Typical pretreatment times are from about three to about ten hours. Subsequent to pretreatment, the supported catalyst composition is typically flushed with inert gas to remove residual traces of oxygen or any adsorbed water prior to use. The finished catalyst is employed in any convenient physical form, for example as powder, flakes, spheres or pellets.

The olefin reactant

The olefins to be employed as reactants in the disproportionation process are acyclic, hydrocarbon monoolefins of from 3 to 40 carbon atoms, preferably from 3 to 25. The olefin reactant is a terminal olefin, i.e., an α-olefin, or incorporates an internal olefinic linkage, and is of straight-chain or of branched-chain structure. Illustrative of suitable olefin reactants are propylene, 1-butene, 2-butene, 1-pentene, 1-hexene, 3-methyl-1-butene, 1-octene, 3-octene, 1-dodecene, 1-octadecene, 3,6-dimethyl-1-octene, eicosene and the like. Best results are obtained, however, when the olefin reactant is a straight-chain α-olefin of from 3 to 16 carbon atoms.

The molecular hydrogen

The precise role of the added molecular hydrogen is not known with certainty, but it is considered likely that it hydrogenates at least a major proportion of any conjugated diene impurity of the olefin feed and also effects hydrogenolysis of whatever olefin oligomer or low polymer builds up on the catalyst surface. If a sufficient quantity of molecular hydrogen is employed, the olefin reactant and olefinic products are extensively hydrogenated and the observed product mixture is predominantly composed of alkanes. Alternatively, however, the utilization of lesser amounts of hydrogen affords the advantages described above without undue loss of olefin through hydrogenation. The amount of molecular hydrogen to be utilized suitably lies between about 1% mole and 60% mole based on total olefin feed, although amounts from about 3% mole to about 35% mole on the same basis are preferred.

The reaction conditions

The disproportionation process is conducted by intimately contacting the olefin reactant, the molecular hydrogen, and the supported catalyst. Suitable reaction temperatures vary from about 0° C. to about 350° C., depending in part upon the particular physical characteristics of the olefin reactant, with the temperature range of from about 50° C. to about 200° C. being preferred and best results being obtained when a reaction temperature from about 85° C. to about 135° C. is utilized. The reaction pressure is not critical and pressures from about 0.5 atmosphere to about 150 atmospheres are satisfactory.

The disproportionation is conducted under conditions whereby the olefin reactant is fluid, that is, either gaseous or liquid. In certain modifications of the process, it is desirable to select reaction conditions so that at least a portion of the products are in a phase different from that in which reaction is taking place. For example, the disproportionation of 1-butene is advantageously conducted under conditions whereby the ethylene product and butene reactant are substantially in the gaseous phase but the heavier products are present as liquids.

The process is suitably conducted in a batchwise manner as by charging the olefin reactant and the supported catalyst to an autoclave or similar reactor and maintaining the mixture at reaction temperature while agitation is applied. In an alternate modification, the reaction is conducted in a continuous operation as by passing the olefin reactant through a tubular reactor wherein the catalyst is maintained in a fixed or fluidized bed. Other conventional contacting techniques are also suitably employed.

In addition to the olefin reactant, the molecular hydrogen and the supported catalyst composition, inert materials may also be present to serve as reaction diluents, for example, gaseous diluents such as nitrogen, argon and methane, or liquid materials including saturated hydrocarbons such as propane, octane or cyclohexane. No apparent advantage arises through the utilization of such diluents, however, and in the preferred modifications of the process no diluent is added. It is also preferred that the process be conducted in the substantial absence of reactive materials such as water.

The products

The disproportionation process of the invention is characterized by a high selectivity to products arising purely from disproportionation while minimizing the formation of heavier materials. Employing an olefin of $n$ carbon atoms as reactant, the process results in the formation of ethylene and olefin of $2n-2$ carbon atoms as the principal products. Lesser amounts of olefin product of carbon number between 2 and $2n-2$ are also observed, and a certain proportion of heavier product of more than $2n-2$ carbon atoms is also obtained. It is a significant feature of the present process that the amount of such heavier product is minimized.

Subsequent to the contacting of the olefin reactant and the supported catalyst, the resulting product mixture is separated and the individual components are recovered by conventional methods as by fractional distillation, fractional crystallization or selective extraction.

The olefin products are, for the most part, chemicals of commerce having established utility as precursors of thermoplastic polymers, e.g., polyethylene and polypropylene. The olefins of higher molecular weight are converted by known hydroformylation procedures to alcohols of one additional carbon atom, which alcohols are reacted with dibasic acids, e.g., phthalic acid, to form plasticizers for polyvinyl chloride or are ethoxylated and/or sulfated to form surface-active materials having detergent character.

To further illustrate the improved process of the invention, the following examples are provided. It should be understood that the details thereof are not to be regarded as limitations as they may be varied as will be understood by one skilled in this art.

EXAMPLE I

A catalyst was prepared which consisted of 10.2% by weight molybdenum as the trioxide, 3.9% by weight cobalt as the oxide, and 1.2% by weight of potassium as the hydroxide, supported on an alumina carrier. The catalyst had a surface area of 268 m.$^2$/g. and a pore volume of 0.50 m.$^2$/g. Prior to use, the catalyst was activated by heating in air at a temperature of 500° C. for five hours.

The catalyst was employed in the disproportionation of propylene in the presence and in the absence of molecular hydrogen. A temperature of 150° C. and a pressure of 1 atmosphere were employed and the feed was introduced to 20 g. of the catalyst at a total gas space velocity of 200 l./kg./hr. The data provided in Table I which follows illustrate the increased disproportionation activity and prolonged catalyst life obtained in the presence of added molecular hydrogen. The percentages reported in Table I are the molar percentages of propylene converted to ethylene and butylene.

TABLE I

| Molar ratio, $C_3H_6$:$H_2$: | Disproportionation, percent mole | | | |
|---|---|---|---|---|
| | 5 hr. | 25 hr. | 50 hr. | 75 hr. |
| 4:0 | 10 | 6 | Trace | |
| 3:1 | 24 | 23 | 14 | 4 |

EXAMPLE II

The effect of conjugated diene on the disproportionation process was determined by conducting the disproportionation of 1-butene in the presence and in the absence of hydrogen at varying butadiene concentrations. The catalyst consisted essentially of 10.2% by weight molybdenum as the trioxide, 3.9% by weight cobalt as the oxide, and 0.6% by weight potassium as the hydroxide, on an alumina support and had been activated by heating in a 2% oxygen-nitrogen mixture at 500° C. for five hours and subsequently in air at 500° C. for one hour. The disproportionation reactions were conducted at a temperature of 145° C., a pressure of 1 atmosphere and feed was introduced to the catalyst at a total gas space velocity of 400 l./kg./hr. The results of the series of reactions are provided in Table II below wherein the percentages given are the molar percentages of 1-butene converted into alkene of 2, 3, 5 and 6 carbon atoms.

TABLE II

| Molar ratio, $C_4H_8$:$H_2$ | Content of $C_4H_6$, p.p.m. | Disproportionation, percent mole | | | | |
|---|---|---|---|---|---|---|
| | | 5 hr. | 25 hr. | 50 hr. | 70 hr. | 120 hr. |
| 8:0 | 1,500 | 26 | 15 | 7 | | |
| 6:2 | 1,500 | 32 | 25 | 14 | 8 | |
| 8:0 | 300 | 37 | 33 | 26 | 24 | 15 |
| 7:1 | 300 | 49 | 45 | 36 | 29 | 19 |

EXAMPLE III

A series of continuous disproportionation runs was conducted by contacting mixtures of 1-butene and nitrogen diluent, with and without butadiene, with a catalyst comprising 3.7% by weight cobalt as the oxide, 10.9% by weight molybdenum as the trioxide, and 1.2% by weight potassium calculated as the hydroxide, on an alumina support. The catalyst had been activated by heating in nitrogen at 525° C. for five hours. The results are provided in Table III below, where the molar disproportionation percentages given are the percentages of 1-butene converted to olefin of 2, 3, 5 and 6 carbon atoms.

TABLE III

| | Run | | | |
|---|---|---|---|---|
| | 1 | 2 | 3 | 4 |
| Feed composition, percent mole: | | | | |
| $N_2$ | 50 | 25 | 49.5 | 24.5 |
| $H_2$ | | 25 | | 24.5 |
| $C_4H_8$ | 50 | 50 | 49.5 | 50 |
| $C_4H_6$ | | | 1.0 | 1.0 |
| Contact time, hr. | 2 | 2 | 3 | 3 |
| Total reaction time, hr. | 6 | 8 | 4 | 29 |
| Disproportionation, percent mole | 24 | 45 | 3 | 40 |

Similar results are obtained when the catalyst comprises 18.6% by weight rhenium as the heptoxide and 1.3% wt. potassium as the hydroxide on an alumina support and the catalyst is activated by heating in nitrogen at 525° C. for five hours.

We claim as our invention:

1. In the process of disproportionating an acyclic hydrocarbon monoolefinic reactant of from 3 to 40 carbon atoms to produce monoolefinic products of higher and of lower numbers of carbon atoms per molecule than the monoolefinic reactant by contacting the monoolefinic reactant at a temperature of about 50° C. to about 200° C. with a catalyst composition consisting essentially of an olefin disproportionation catalyst selected from the group consisting of an oxide of molybdenum, tungsten, and rhenium in a high positive oxidation state and a catalyst support of at least 75% alumina with any remainder being essentially inert support material and recovering the disporportionation products as monoolefins, the improvement which comprises employing as a feed to said catalyst composition a mixture consisting essentially of said monoolefinic reactant and from about 1% to about 60% mole based on total monoolefinic reactant of molecular hydrogen.

2. The process of claim 1 wherein the catalyst composition additionally contains from about 0.05% by weight to about 5% by weight, calculated as metal on the catalyst support, of an alkali metal compound wherein the alkali metal is alkali metal of atomic number from 19 to 55 inclusive.

3. The process of claim 2 wherein the olefin is a straight chain α-olefin of 3 to 16 carbon atoms.

4. The process of claim 3 wherein the olefin is propylene.

5. The process of claim 3 wherein the olefin is butene.

6. The process of claim 3 wherein the disproportionation catalyst is present in amounts from about 0.5% by weight to about 30% by weight, calculated as the metal on the catalyst support.

7. The process of claim 6 wherein the catalyst is a molybdenum oxide promoted by from about 0.5% by weight to about 5% by weight, calculated as the metal on the catalyst support, of cobalt oxide, and the alkali metal of said alkali metal compound is potassium.

References Cited

UNITED STATES PATENTS

| 2,307,240 | 1/1943 | Ruthruff | 260—680 |
| 3,161,697 | 12/1964 | Choufoer et al. | 260—683.9 |
| 3,261,879 | 7/1966 | Banks | 260—683 |
| 3,340,322 | 9/1967 | Heckelsberg | 260—683 |

PAUL M. COUGHLAN, JR., Primary Examiner

C. E. SPRESSER, JR., Assistant Examiner